US007072890B2

(12) United States Patent
Salerno et al.

(10) Patent No.: US 7,072,890 B2
(45) Date of Patent: Jul. 4, 2006

(54) METHOD AND APPARATUS FOR IMPROVED WEB SCRAPING

(75) Inventors: John J. Salerno, Deerfield, NY (US); Douglas M. Boulware, Clinton, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 480 days.

(21) Appl. No.: 10/371,849

(22) Filed: Feb. 21, 2003

(65) Prior Publication Data

US 2004/0167876 A1 Aug. 26, 2004

(51) Int. Cl.
*G06F 17/30* (2006.01)
(52) U.S. Cl. ............................................ 707/5; 707/10
(58) Field of Classification Search .................... 707/3, 707/10, 102, 104, 1, 5; 709/203, 209, 219
See application file for complete search history.

(56) References Cited

U.S. PATENT DOCUMENTS

| 5,907,680 | A | * | 5/1999 | Nielsen ...................... 709/228 |
| 5,937,160 | A | * | 8/1999 | Davis et al. ................. 709/203 |
| 6,078,914 | A | * | 6/2000 | Redfern ......................... 707/3 |
| 6,721,736 | B1 | * | 4/2004 | Krug et al. .................... 707/5 |
| 6,920,609 | B1 | * | 7/2005 | Manber et al. ............. 715/513 |
| 2002/0078143 | A1 | * | 6/2002 | De Boor et al. ............ 709/203 |
| 2002/0099723 | A1 | * | 7/2002 | GArcia-Chiesa ............ 707/200 |

* cited by examiner

*Primary Examiner*—Leslie Wong
*Assistant Examiner*—Robert M. Timblin
(74) *Attorney, Agent, or Firm*—Joseph A. Mancini

(57) ABSTRACT

Method and apparatus to enable the parser component of a web search engine to adapt in response to frequent web page format changes at web sites. Parser "learns" from a set of defined HTTP links, how to find and parse web pages returned from a search engine query. The invention intelligently locates various token/strings that will correctly extract attributes associated with the returned item. Present invention may operate either automatically or in a user-assisted fashion.

1 Claim, 1 Drawing Sheet

METHOD AND APPARATUS FOR IMPROVED WEB SCRAPING

STATEMENT OF GOVERNMENT INTEREST

The invention described herein may be manufactured and used by or for the Government of the United States for governmental purposes without the payment of any royalty thereon.

BACKGROUND OF THE INVENTION

Technical Field of the Invention

The present invention relates generally to the field of internet searching and more specifically to improving the process of parsing internet search results retrieved by meta-search engines where changes in web sites have occurred.

When using one of many popular search engines on the Internet to search for a particular topic a user is interested in, most of the results returned are unrelated, or don't have the information the user is searching for. Typically the user ultimately looks through many Web pages before the information is found—if in fact he finds what he is looking for! Different search engines search different parts of the Internet (alternately, the "Web") and thus give the user different results. Which search engine to use is often in question.

A typical scenario follows. A user wishes to perform research in a specific area or perhaps desires to write an article or report. First, many users would come up with an outline of the report or article on which they are researching. Second, and prior to the pervasiveness of the Web, he would go to the library and find other articles or reports similar to what he is looking for. This is usually done nowadays through on-line card catalogues.

In contrast, today a user logs on, brings up a web browser, and connects to a search tool. However, literally hours can be expended entering different keywords in various permutations in an attempt to find relevant documents. The user may actually find very little information for his effort. The user then runs a second search tool and repeats the entire process. After hours of searching and typing the user may have found a few documents.

Many people believe the Internet is a vast library of interconnected resources and the only difference between individual search tools are the techniques they use to find relevant documents. What few realize is that each search tool is searching against their own database of collected indices. These databases are built by the search tool vendors starting with a collection of URLs and following each URL on each page until all have been exhausted. This is typically accomplished through the use of spiders or crawlers. Since these tools are starting at different places, the databases themselves contain different information.

For this reason, meta-search engines are increasing in popularity. These engines access multiple individual search tools and thus multiple databases. The advantage is that by using multiple databases the search is covering more of the Internet and hopefully produces better results. A second advantage of using multiple search engines is collaboration among the results they each produce. For example, if two or more sources return the same document one can say that document is likely more relevant than a single source returning the same or another document.

The problem with each of the methods of searching the Internet is that there is no perfect engine when it comes to finding the information that a user may need. Additionally, there is no absolute basis for a comparison of the engines as each has its own unique features and databases. A site on the Internet that is clearly the best may not be able to be found by querying only one individual search engine, leaving the user to have to go to several search engines to perform a search accurately. In principal, a meta-search engine is a good alternative to individual search engines, but each of the hundreds of meta-search engines uses a different algorithm or method of sorting the results. None of these algorithms stand out as being superior to the others. Meta-search engines are also as commercial as the individual search engines, selling a high return on its list of sites to the highest paying customer. This causes the user to have a poor representation of what is available on the Internet for the topic that they search for.

Meta-search engines are not without their own problems. These engines query individual search engines and parse the source's results page. The parser that a meta-search engine uses must be knowledgeable about the source's results page format. If the format changes, the meta-engine's parser can fail. It has been found that web page results change on some sources every one to two months. For the most part, maintenance on these parsers is done by the developer and generally requires software code changes. For those meta-search engines that are accessed through a web browser, the maintenance is done centrally. Those that are client-based require a software patch to be downloaded. Besides maintenance, meta-search engines are not user configurable. Users cannot modify or fix the broken parser nor can they add their own.

Today's meta-search engines utilize a concept called Web Scraping. Web Scraping involves the process of querying a source, retrieving the results page and parsing the page to obtain the results. At that point, the meta-search engine will then normalize the information, and in many cases, combine them with other results and present a single ranked list. The problem with this approach is that individual sources change the format of their pages often. Web scrapers break when this happens; therefore maintenance is critical. One approach taken by a majority number of meta-search engines is to provide centralized service. That is, the meta-search engine is hosted on a centralized server and access is through a web browser. A few have opted to provide a client application. In both cases, the user is at the mercy of the developer. If a web scraper breaks, the user must wait for the developer to fix it. Centralized approaches are easier to fix and require no software changes on the part of the user. On the other hand, client applications would require a patch to be downloaded. In both cases, the user has no control and cannot add additional sources at will.

In U.S. Patent Application Ser. No. 10/198,245, entitled "Method and Apparatus for Improved Internet Searching", incorporated by reference herein, a new method was disclosed that separated the process of parsing from that of the knowledge required to parse. That is, a configuration file was maintained that stored the strings/tokens that are required by the parser to be capable of parsing the given source's web page results. This solution only solved part of the problem. The maintenance was just moved from a programmer/developer to an administrator/web designer and still requires a person to manually review each broken configuration and make the necessary changes. What is really required is the ability to automatically identify broken adapters and intelligently fix them. This is the goal of the Self-Healing Parser (SHP) as described below.

OBJECTS AND SUMMARY OF THE INVENTION

One object of the present invention is to provide a method and apparatus for web scrapers to automatically adapt to changes made to the individual web search sites.

A related object of the present invention is to increase the coverage of a given web search and maximize the results returned.

The invention described herein enables the parser component of a web search engine to adapt in response to frequent web page format changes at web sites. Parser "learns" from a set of defined HTTP links, how to find and parse web pages returned from a search engine query. The invention intelligently locates various token/strings that will correctly extract attributes associated with the returned item. The invention identifies "good links", i.e., links that result in matches between stored query returns from past searches and current searches on a particular topic. A "good link" is not an advertisement nor is it a link to information not pertaining to the query topic. The invention also stores "begin hits", i.e., actual bits on links directly relevant to the search topic, rather than miscellaneous bits on items such as paid advertisements. Begin bits are a sequence of consecutive characters and/or tokens that appear in front of every "good link" but not in front of "bad links". Present invention may operate either automatically or in a user-assisted fashion.

According to an embodiment of the present invention, method for improved web scraping, comprises the steps of obtaining a results page for a given web site/query; determining whether the source of the results was previously requested; if the source was previously requested, then retrieving the known links from the database; comparing the known links to the links on the results page; determining whether "N" good links have been found; if "N" good links have been found, then identifying the "N" good links; building a stack of potential "begin hits" HTML tags and strings for each of the selections "1" through "N"; comparing entries of the stack to find the "best" combination of the "begin hits" HTML tags and strings; writing to and updating configuration file so as to terminate process; otherwise if the source was not previously requested, then returning to the step of parsing the results page to identify all links; otherwise if "N" good links have not been found, then parsing the results page to identify all links; presenting list of the links to the user; manually selecting "N" good links; and returning to the step of identifying said "N" good links.

Advantages and New Features

There are several advantages and new features of the present invention relative to the prior art. An important advantage is the fact that the present invention provides a method for the search engine to learn from the results of searching.

A related advantage stems from the fact that once the present invention has "learned", it can access more sources and return more information.

DETAILED DESCRIPTION OF THE PREFERRED EMBODIMENT

Figure 1:
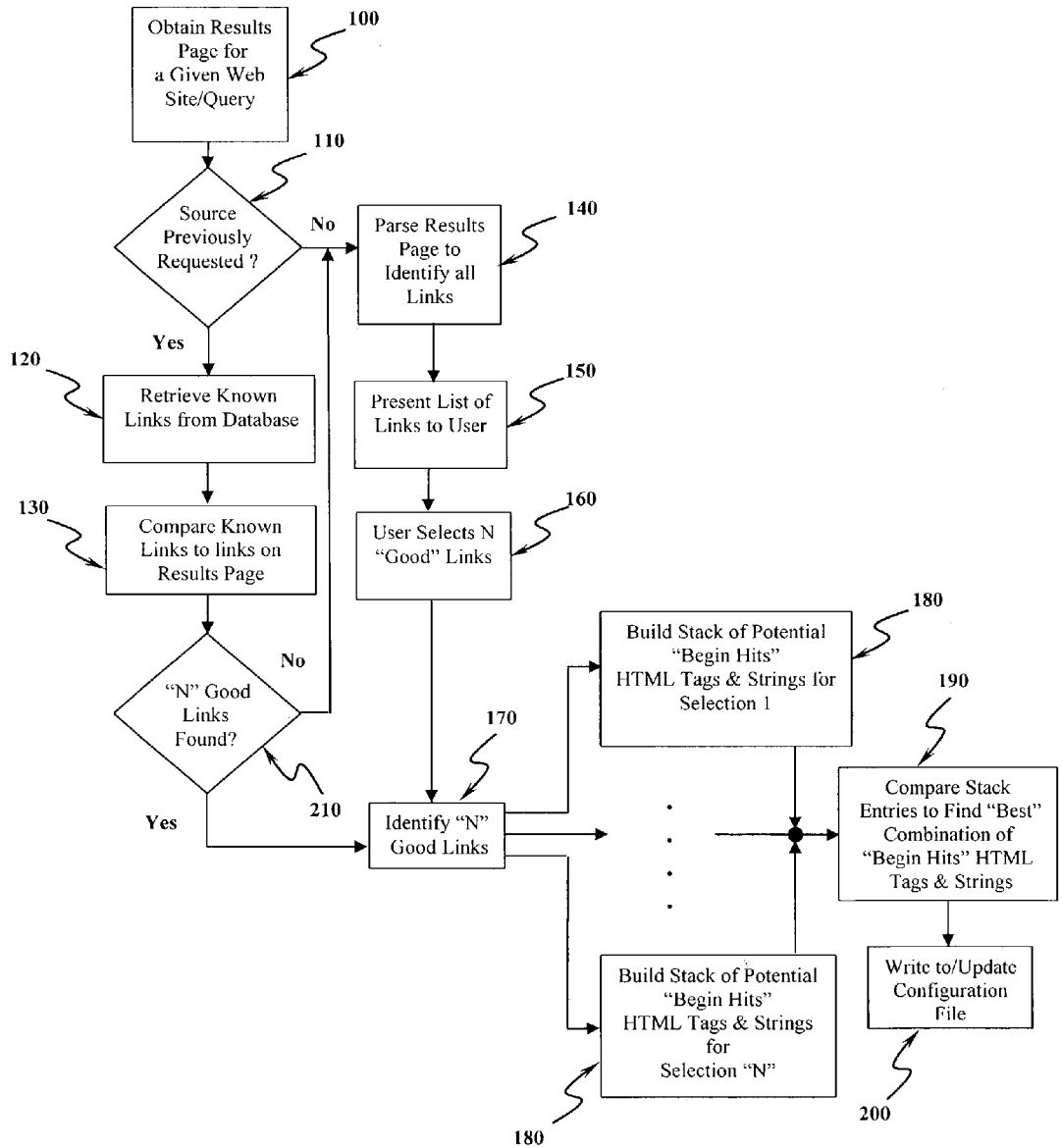
FIG. 1 depicts a flowchart of the process performed by the present invention.

The present invention provides a method and apparatus for improved web scraping. Referring to FIG. 1, all web pages that are returned back from a search engine request contain many links to various references. Some of these are commercial advertisements, other sites and in some cases the actual results that we are looking for. By identifying those links that are of interest, an algorithm can be developed which learns the necessary identifiers or tokens to be passed to a parser that has the ability to parse the results page and pull out all similar links.

There are two ways in which the desired links can be identified: (1) automatically and (2) user assisted. The self-healing routines will read the URL and request string format from the configuration file and execute 100 a test query. A check 110 is then made to see if both the source and the request have been previously made. If so, the known links are retrieved 120 from the database and each of the retrieved links is compared 130 to those found on the results page. This process continues until it is determined 210 that "N" good links are found. If this is a new source or one in which the given request has not been performed or "N" good links were not identified in the automated process, user assistance will be required. In the user-assisted mode, the results page is parsed 140 to find all HTTP links. This list is then presented 150 to the user. The user will review each link and select 160 a number of "Good" links to train the system.

In either case (the automatic or user assisted), once the links have been identified 170, a stack of HTML tags and strings is built 180 for each of the links (working from the link backwards) After completing this portion of the process, each entry of each stack is compared 190 with each other to find the "best" combination HTML tags or strings. This result is then written 200 to a configuration file and is used by the parser.

While the preferred embodiments have been described and illustrated, it should be understood that various substitutions, equivalents, adaptations and modifications of the invention may be made thereto by those skilled in the art without departing from the spirit and scope of the invention. Accordingly, it is to be understood that the present invention has been described by way of illustration and not limitation.

What is claimed is:

1. A method for improved web scraping, comprising the steps of:

obtaining a results page for a given web site/query;

determining whether the source of said results was previously requested;

IF said source was previously requested, THEN retrieving known links from database;

comparing said known links to links on said results page;

determining whether "N" good links have been found;

IF said "N" good links have been found, THEN identifying said "N" good links;

building a stack of potential "begin hits" HTML tags and strings for each of selections "1" through "N";

comparing entries of said stack to find "best" combination of said "begin hits" HTML tags and strings;

writing to and updating configuration file so as to terminate process;

OTHERWISE;
  returning to said step of parsing said results page to identify all links;
OTHERWISE;
  parsing said results page to identify all links;
  presenting list of said links to user;

manually selecting "N" good links; and
returning to said step of identifying said "N" good links.

* * * * *